June 23, 1959 — R. M. SANDO ET AL — 2,891,785

ENERGY ABSORBER

Filed Dec. 6, 1957 — 2 Sheets-Sheet 1

WITNESSES
Edwin E. Bassler
James F. Young

INVENTORS
Robert M. Sando &
Forrest E. England
BY
ATTORNEY

United States Patent Office 2,891,785
Patented June 23, 1959

2,891,785
ENERGY ABSORBER

Robert M. Sando, Baltimore, and Forrest E. England, Linthicum Heights, Md., assignors to Westinghouse Electric Corporation, East Pittsburgh, Pa., a corporation of Pennsylvania Application December 6, 1957, Serial No. 701,195

4 Claims. (Cl. 267—1)

This invention relates to an energy absorber having a variable rate of energy absorption and, more particularly, to a variable rate energy absorber capable of dissipating both kinetic and steady-state loads.

Although not limited thereto, the present invention finds particular utility in installations where a relatively large mass, such as a radar antenna, must swing through an arc between two stop members. In such installations, shock or energy absorbers must be installed between the antenna and the stop members in a very small space. Furthermore, the energy absorbers must be capable of dissipating the steady-state forces from the hydraulic drive mechanism for the antenna while simultaneously absorbing the kinetic energy of the antenna.

Previous to this invention, various spring-loaded energy absorbers were tested for the purpose of absorbing both steady-state and kinetic loads. For the available space allowed in the antenna design, however, it became apparent that the load could not be absorbed by conventional spring methods without failure of the metallic spring fibers in torsional shear. Hydraulic springs were considered for use with an antenna, but temperature limitations prevented their use.

It is an object of this invention to provide an energy absorber capable of absorbing both kinetic and steady-state loads.

More generally, an object of the invention is to provide a new and improved energy absorber.

A further object of the invention is to provide an energy absorber in which, for a given size, maximum energy absorption characteristics are achieved.

A still further object for the invention is to provide an energy absorber which will operate over a wide range of temperatures.

As will become apparent from the following description, the energy absorber of the present invention provides for a material, such as rubber, to be subjected to a direct axial compression load and restrained laterally by an elastic member that provides the correct amount of spring stiffness by the absorption of energy due to the phenomenon of "hoop tension." The effect of direct compression-deflection, combined with direct hoop-tension elongation acting simultaneously, provides for the complete system to be subjected to uniform stress distributions which are the most efficient method of absorbing energy.

The foregoing and other objects and features of the invention will become apparent from the following detailed description taken in connection with the accompanying drawings which form a part of this specification, and in which.

Figure 1:
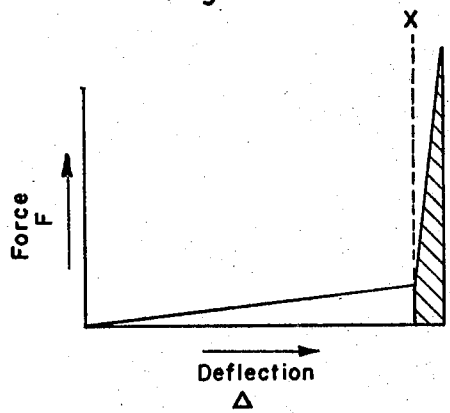
Figure 1 is a force-deflection graph showing the characteristics of a spring under steady-state and kinetic loads.

Referring to Fig. 1, it can be seen that when a spring positioned within a cylinder between two pistons is employed as an energy absorber for a mass having steady-state and kinetic force components, comparatively very little work (represented by the area under the curve) is performed by the absorber before engaging a mechanical stop at point X. Consequently, the remaining energy is expressed as a large force over a small deflection, shown by the shaded area in Fig. 1. It has been found that after engaging the mechanical stop, the actual deflection is due to the deformation of the contact surfaces and adjacent structure. This peak force associated with the spring absorber is a very real problem and induces stresses in adjacent hydraulic parts in excess of their allowable design stresses, thus causing failure.

The total work of an absorber capable of handling both steady-state and kinetic forces may be expressed as:

$$\int F d\Delta = F_h \delta + U$$

where $F$ = total force on absorber;
$\Delta$ = linear deflection at any point in the travel of the absorber;
$F_h$ = steady-state force;
$\delta$ = actual total deflection of the absorber; and
$U$ = kinetic energy.

Furthermore, the total force, $F$, may be expressed as $$F = \left(\frac{AE}{L}\right)\Delta$$

where $A$ = cross-sectional area of the absorbing material;
$E$ = Young's modulus of the absorbing material; and
$L$ = length of the absorber.

The factor $$\left(\frac{AE}{L}\right)$$

is a constant expressed in pounds per inch. Therefore, the preceding equation may be expressed as:

$$F = K\Delta$$

where $$K = \left(\frac{AE}{L}\right)$$

Figure 2:
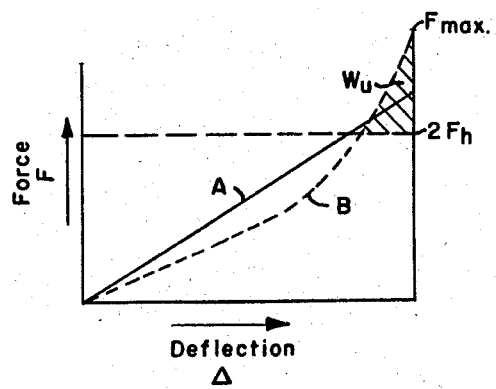
Fig. 2 is a force-deflection graph of an ideal energy absorber for both steady-state and kinetic loads.

It the total force on the absorber, $F$, is plotted against linear deflection, $\Delta$, according to the foregoing equation, linear curve A of Fig. 2 will result. In actual practice, however, the deflection curve for resilient materials, such as rubber, duplicates curve B shown in Fig. 2 and only approximates curve A.

Since the curve of Fig. 2 has a gradual slope upward, a large amount of the work of the absorber, represented by the area under the curve, is accomplished in the initial stages of deflection. This is in contrast to the curve of Fig. 1 where very little work is done in the initial stages, almost all of the work being done after point X is reached.

This, of course, results in extremely high forces in the last stages of deflection which cause failure of structural members between which the absorber is positioned.

It can be shown mathematically that the maximum total deflection of an absorber, $\delta_{max}$, is represented by the equation:

$$\delta_{max} = \frac{1}{K} F_h \left[ 1 + \sqrt{1 + \frac{2UK}{F_h^2}} \right]$$

where the symbols correspond to those already described. Therefore, the total force which the absorber can handle is equal to the product of K times $\delta_{max}$ or:

$$F_{max} = F_h \left[ 1 + \sqrt{1 + \frac{2UK}{F_h^2}} \right]$$

Without any kinetic energy load on an absorber, U will equal zero. Consequently, $$F_{max} = F_h [1 + \sqrt{1+0}]$$

or $$F_{max} = 2F_h$$

Therefore, without any kinetic energy load, the energy absorber will have to overcome the load, $2F_h$, in the allowed travel. The work performed by the absorber will simply be the area under its force-deflection curve up to the point $2F_h$ as shown in Fig. 2. With kinetic energy present, however, the absorber must be capable of carrying a load above the value of $2F_h$ and envelop an additional area which would correspond to the work performed by the absorber as it consumes kinetic energy. This area, shown shaded in Fig. 2, is that area under the curve between the values of $2F_h$ and $F_{max}$, identified as $W_u$.

Figure 3:
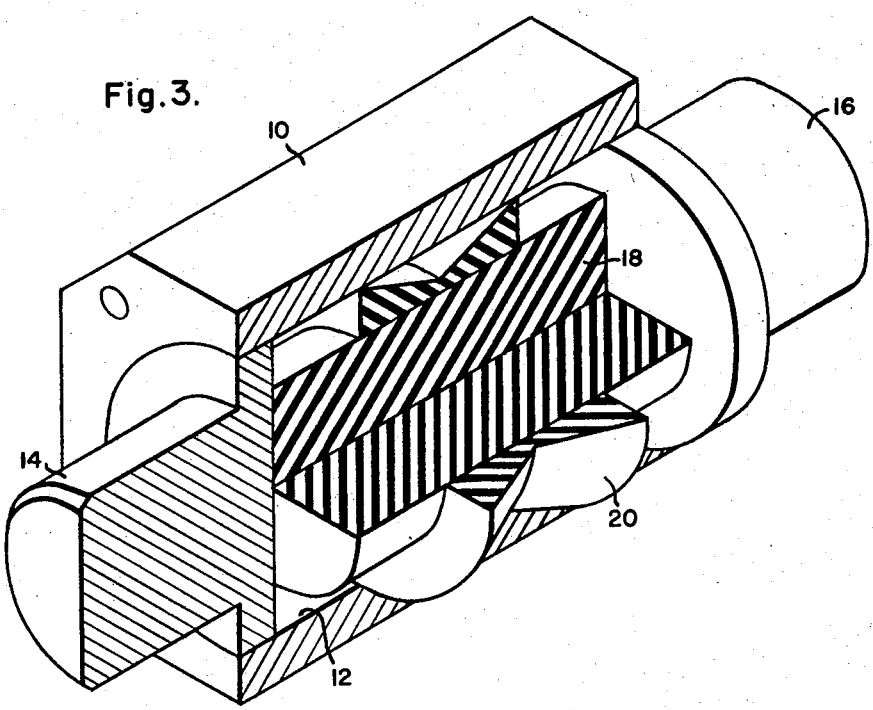
Fig. 3 is a broken-away perspective view of the present invention.

An embodiment of the present invention for producing a force-deflection curve similar to that shown by curve B in Fig. 2 is shown in Fig. 3. It comprises an outer housing 10 having a cylindrical bore 12 extending therethrough. Reciprocably mounted in opposite ends of the bore 12 are two pistons 14 and 16. Between pistons 14 and 16 is a cylindrical core 18 of silicon rubber or other suitable resilient material. As shown, the core 18 is positioned coaxially with respect to the pistons 14 and 16, and the cylindrical bore 12. Surrounding the mid-portion of core 18 is a tension band 20 which may also be fabricated from silicon rubber or some other suitable resilient material. It will be noted that the entire inner peripheral area of the band 20 abuts the periphery of core 18. The outer periphery of the band, however, gradually tapers from a maximum at the opposite ends of the band where the cross-sectional area is substantially equal to the cross-sectional area of bore 12, to a minimum midway between its ends. This channeled portion in the band is provided to permit radial outward expansion of the core 18 upon converging movement of pistons 14 and 16.

Figure 4:
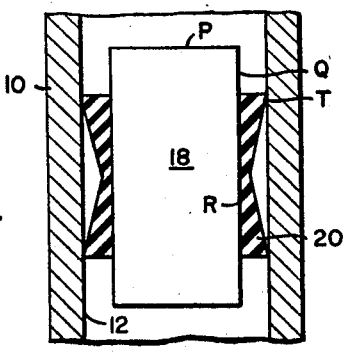
Fig. 4 is a schematic diagram of the invention showing the location of parts under no-load conditions.
Figure 5:
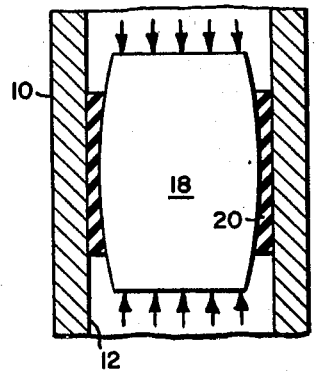
Fig. 5 is a schematic diagram of the invention showing the location of its parts under a fully loaded condition.

Operation of the invention may best be understood by reference to Figs. 4 and 5. However, before proceeding with a description of operation, the effects of an energy load on rubber or similar material should be considered. In the first place, rubber is assumed to be an incompressible substance and can only be deflected when subjected to a compression load if it is allowed to expand laterally. Furthermore, the more lateral restraint imposed on the rubber the greater its stiffness. This can also be stated in the following terms: Rubber has the greatest stiffness per unit of load-carrying area when the ratio of free lateral area to load-carrying area is a minimum. When a material such as rubber is subjected to an energy load, the distribution of stress in the material should be as uniform as possible throughout the material so that the energies absorbed by all unit volumes will be approximately equal. This can be shown to be true by the following basic relationship:

$$Y = \frac{S^2 a L}{2E}$$

where $Y$ = required amount of strain energy absorption;
$S$ = unit stress;
$a$ = cross-sectional area of the material;
$L$ = length of the material; and
$E$ = modulus of elasticity of the material.

From the foregoing equation, it is obvious that direct axial loading of a member to provide for a uniform stress distribution over the cross section of the material is superior to a method of inducing bending stresses in a member which results in non-uniform stress distribution.

By reference to Figs. 4 and 5, it will be seen that the present invention utilizes the maximum energy absorption characteristics of a material such as rubber, as outlined above, to produce a force-deflection curve similar to that shown in Fig. 2. Upon application of a uniform axial compression load on the circular load area P in Fig. 4, the energy-absorbing material is compressed at a linear spring rate for the first phase of operation. The lateral strain areas consist of (1) the complete free area Q, (2) the elastic restricted area R defined by the inner periphery of band 20, and (3) the fully or rigidly restrained area T. Gradual increase of an axial load on area P causes the absorbing material to subject the adjacent band to "hoop-tension" stresses. The combined effect of energy absorption by compression of the core and tension in the band results in a uniform load distribution on all unit volumes of the absorbing material at the desired spring rate. A gradual reduction or transfer of free and semi-free lateral strain areas to a full rigid restraint area between the uncompressed and fully compressed conditions by the gradual increase of load results in a non-linear spring rate of increased stiffness. A maximum load condition will result in the elimination of the lateral free areas Q and R, resulting in the absorbing material making contact with the inner walls of the cylindrical housing 10 and completely filling the housing cavity 12 as shown in Fig. 5. This condition imparts into the design a high structural safety factor in that it prevents the band 20 from excessive elongation.

It is apparent from the foregoing that the present invention provides an energy absorber which has a low initial stiffness and a gradual approach to higher stiffness upon addition of load. The invention is also capable of absorbing large energy loads within the prescribed volume, thus requiring all energy to be absorbed either by direct compression or tension strain energy in order to achieve maximum use of the bulk absorbing material.

Figure 6:
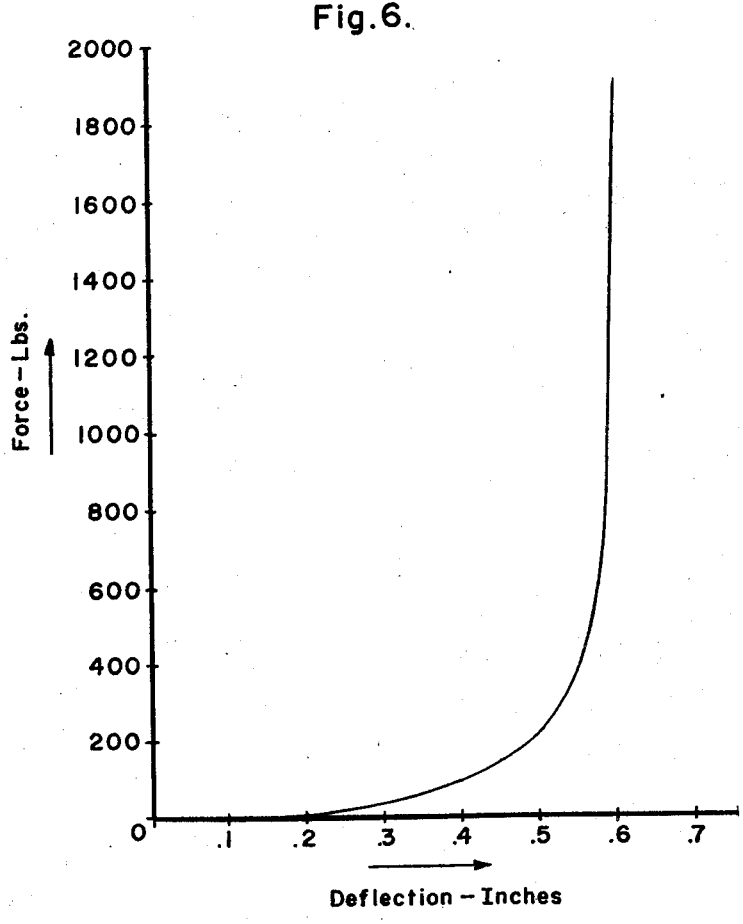
Fig. 6 is an illustration of the actual force-deflection characteristic of the present invention.

Fig. 6 shows the actual force-deflection characteristic of a shock absorber constructed according to the principles of the present invention and having the following dimensions:

|  | Inches |
| --- | --- |
| Diameter of core 18 | 1 |
| Length of core 18 | 2 |
| Length of band 20 | 1¼ |
| Diameter of cylindrical bore 12 | 1.4 |

It can be seen that the curve of Fig. 6 closely approximates the curve of Fig. 2, resulting in an energy absorber in which the total work is distributed over a wide range of deflection.

Although the invention has been shown in connection with a certain specific embodiment, it will be readily apparent to those skilled in the art that various changes in form and arrangement of parts may be made to suit requirements without departing from the spirit and scope of the invention.

We claim as our invention:

1. An energy absorber comprising a housing structure having a generally cylindrical bore extending therethrough, pistons mounted in opposite ends of said cylindrical bore for reciprocating movement, a cylindrical member of solid resilient material coaxial with respect to said bore and positioned between said pistons, said cylindrical member having a diameter less than the diameter of said bore, and an annular member of resilient material surrounding said cylindrical member midway between its ends, said annular member having an outer diameter at its edges substantially corresponding to the diameter of said bore and an outer diameter between said edges which gradually tapers from a maximum at each of the edges to a minimum midway between said edges.

2. An energy absorber comprising a housing structure having a generally cylindrical bore extending therethrough, members mounted at opposite ends of said cylindrical bore for movement into and out of the ends of the bore, a cylindrical member of silicon rubber coaxial with respect to said bore and positioned between said first-mentioned members, said cylindrical member having a diameter less than the diameter of said bore, and an annular member of silicon rubber surrounding said cylindrical member midway between its ends, said annular member having an outer diameter at its edges substantially corresponding to the diameter of said bore and an outer diameter between said edges which gradually tapers from a maximum at each of the edges to a minimum midway between said edges.

3. An energy absorber comprising a housing structure having a bore extending therethrough, pistons mounted in opposite ends of said bore for reciprocating movement, a first member of solid resilient material coaxial with respect to said bore and positioned between said pistons, said first member having a cross-sectional area less than the cross-sectional area of said bore, and a second member of resilient material surrounding said first member midway between its ends, said second member having an outer periphery at its edges substantially corresponding to the periphery of said bore and an outer periphery between said edges which gradually decreases from a maximum at each of the edges to a minimum midway between said edges.

4. An energy absorber comprising a housing structure having a bore extending therethrough, pistons mounted in opposite ends of said bore for reciprocating movement, a first member of resilient material positioned between said pistons, said first member having a cross-sectional area less than the cross-sectional area of said bore, and a second member of resilient material surrounding said first member, said second member having an outer periphery at its edges substantially corresponding to the periphery of said bore and an outer periphery between said edges which gradually tapers from a maximum at each of the edges to a minimum midway between said edges.

References Cited in the file of this patent

UNITED STATES PATENTS

| | | |
|---|---|---|
| 119,823 | Cochran | Oct. 10, 1871 |
| 1,679,698 | Weydert | Aug. 7, 1928 |
| 2,205,098 | Lamont | June 18, 1940 |
| 2,328,877 | Gallagher | Sept. 7, 1943 |